B. HOLLY.

Water Supply Regulator for Water Works.

No. 4,085. Reissued Aug. 2, 1870.

*Witnesses.*
R. T. Campbell
E. N. Campbell

*Inventor*
Burdett Holly
by
Marion, Kenrick & Lawrence

THE NORRIS PETERS CO., PHOTO-LITHO., WASHINGTON, D. C.

UNITED STATES PATENT OFFICE.

BIRDSILL HOLLY, OF LOCKPORT, NEW YORK.

IMPROVEMENT IN WATER-SUPPLY REGULATORS FOR WATER-WORKS.

Specification forming part of Letters Patent No. 87,413, dated March 2, 1869; reissue No. 4,085, dated August 2, 1870.

DIVISION A.

*To all whom it may concern:*

Be it known that I, BIRDSILL HOLLY, of Lockport, in the county of Niagara and State of New York, have invented a new and Improved Water-Supply Regulator for Water-Works; and I do hereby declare that the following is a full, clear, and exact description thereof, reference being had to the accompanying drawings, forming part of this specification, in which—

Figure 1:
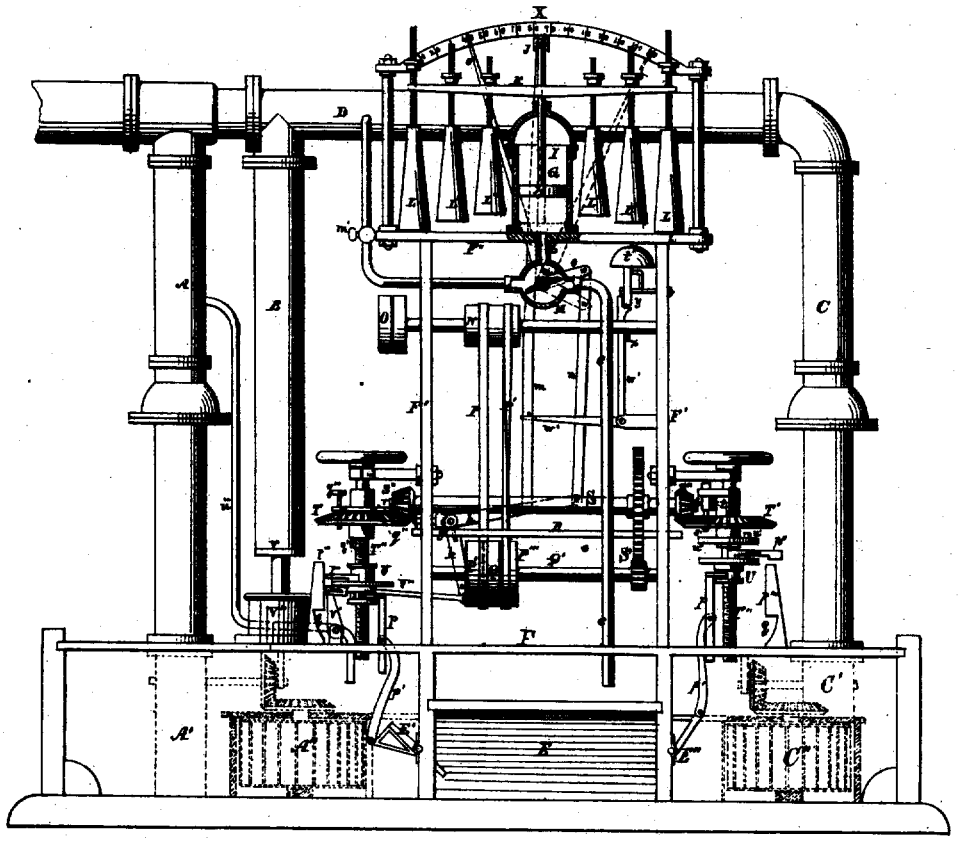
Figure 2:
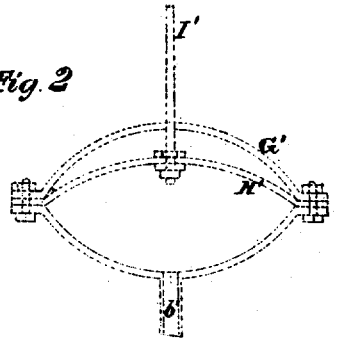
Figure 3:
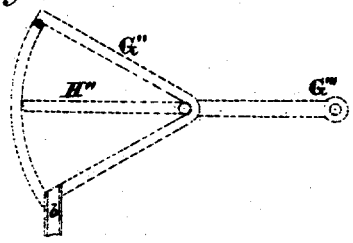

Figure 1 is a front elevation of my invention. Fig. 2 is a detail section, showing a modification of the piston-chamber. Fig. 3 is a second modification of the piston-chamber.

Similar letters of reference indicate corresponding parts in the several figures.

The object of this invention is to provide an effective and reliable means for governing or regulating the supply of water in the street-mains of town water-works. It is designed more particularly for those towns and cities where there is no natural head to give the requisite pressure for carrying the water into the upper stories of the buildings, and where the water is forced into the street-mains by water or steam power pumps, but is also applicable solely as a fire apparatus in any city, whether supplied with artificial water-works or otherwise. Its office, more particularly expressed, is to regulate the admission of water to the motors which drive the forcing-pumps, supplying water to the street mains and pipes by the timely opening or closing of the water-gates. When steam-power is employed the same apparatus operates in the same automatic manner to open or contract the steam-passages leading to the pump-engines, by acting upon any suitable throttle valve or valves, in a similar manner to that by which it operates the water-gates.

In those towns or cities which are unprovided with a natural head of water of suitable height, the proper pressure to force the water into the street-mains and upper parts of buildings must be obtained by artificial power, as steam or water power, and for this purpose steam-engines or turbines are commonly used to drive any suitable forcing-pumps, as rotary or reciprocating pumps.

A set of such pumps is kept constantly running, to maintain a constant supply in the pipes for domestic and other ordinary purposes; but when, from any cause, as that of fire, a larger supply and increased pressure are required, additional pumps must be put into operation, or those already working must be driven with greater velocity, and it is the office of my invention to accomplish automatically the regulation of the supply and pressure when occasion arises for such regulation. For this purpose the pressure of the water (in the street-mains and the accessory pipe connecting them with the apparatus) is made use of as means of communicating with the regulator and setting it in motion, after which it performs its regulating functions automatically, as will be shown.

Fig. 1 is a front elevation of the apparatus complete. A B C are vertical pipes, and D a horizontal pipe communicating with them. The pipes A and C receive the water from the rotary pumps A′ C′, which are driven by the turbines A″ C″. (Shown in dotted lines.) The pipe D leads to some main pipe, from whence the street-mains branch off and ramify throughout the town or city. E is a sluiceway or water-way, having gates E′ E″, which admit water to the turbines driving the pumps. As the gates are opened or closed, so will the speed of the turbines and pumps be accelerated or retarded, and the quantity of water forced into the pipes, and the consequent pressure of the same, be increased or diminished.

The ordinary pressure, for domestic purposes and other daily uses, will be, in most cases, about forty pounds per square inch, and this pressure may be kept up by driving a sufficient number of pumps at a slow rate of speed; but should a fire break out, greater pressure and quantity of water will be required, for the time, in the street-mains, and the increase of the speed of the pumps then running, or the setting in motion of other auxiliary pumps, will be accomplished by the regulator.

F is a bed-plate, having uprights F′ F′ and cross-plate F″, upon which latter a piston-chamber, G, is affixed. This chamber is provided with a piston, H, the rod I of which passes up through the top or dome of the chamber, as shown. Above the dome the piston-rod bears two cross-heads, J and K. From the cross-head K an equal number of weights, L L′ L″, &c., is suspended, in such a manner that when the piston rises the weights will not be raised at once, but successively, so that the impulse which raises them will be expended in a succession of resistances, thereby preventing the piston from rising with a sudden jerk or jump. Instead of the weights L L′ L″, one or more chains may be employed, which will increase the weight brought to bear on the cross-head K as that cross-head rises. The cross-head J is a means by which the piston is connected with the mechanism which is dependent upon it for action, and will be hereafter duly explained.

M is a water-gage, having a radial valve, *a*, within a chamber, which connects with the piston-chamber G below the piston by a pipe, *b*, and with any of the pipes A B D, &c., by a pipe, *c*. It is further provided with waste-water pipe *e*. This gage-chamber is made circular, except in that portion through which the right-hand wing of the valve *a* is to move, and which is so constructed in that portion by means of an inclined surface that the valve shall not entirely prevent the flow of water through the water-gage, but only to diminish that flow when the valve is turned to the left, and to increase it as it is turned to the right. The valve *a* works on an axis which is rigidly connected with the lever *o′*, which serves as an index, as will be more fully shown presently. As that index is moved to the left the discharge through the pipe *e* is lessened, and as it is moved to the right that discharge increases, and the form of the gage-chamber should be such that this increase or diminution should be gradual, and as nearly uniform as possible. The other wing of this valve *a* is not intended to prevent the free ingress of the water through the pipe *c* at any point of the range which is to be given to this index.

Now, if the pipe *e* were entirely closed the pressure in the piston-chamber G would be the same as that in the pipes A B C &c.; but when an outlet is opened through the pipe *e* the pressure in the piston-chamber G will become less than that in the pipes A B C, &c., and the more freely this outflow through the pipe *e* may be the greater will be the difference between this pressure in the piston-chamber G and that in the pipes A B C. Coupled with the mechanism herein described is a contrivance by which to preserve a uniform pressure upon the piston H. When that pressure is increased beyond the standard amount, which is regulated by the weights L L′ L″, as hereinafter shown, machinery is set in operation by which the pressure in the main pipe A B C is diminished until the standard pressure upon the piston H is attained, and when that pressure falls below that fixed standard the same machinery operates automatically, so as to increase the pressure upon the main pipes until the due degree is felt upon the piston H. By this means any slight disturbance of the equilibrium will be readily corrected, and a uniformity of pressure upon the piston H will be secured. The contrivances by which this compensatory action is produced will be made the subject-matter of subdivision B of this reissue, and will need no further description now.

A graduated scale, X, is shown on the drawing, furnished with suitable index or lever *o′*, previously mentioned, which is rigidly attached to the axis of the valve *a*. The numbers on this scale are intended to indicate the point where this index must be fixed, in order that a pressure of a corresponding number of pounds per square inch should be felt in the pipe D, in order to secure the requisite pressure upon the piston H to retain it in the right position. If we fix that index at 40 then a pressure of forty pounds per square inch will be needed to give the standard pressure upon the piston H. If, now, this index be moved and fixed at 150, the valve *a* will move so as to allow a much more copious escape of water through the pipe *e*, and the pressure upon the under side of the piston H will be greatly diminished.

The machinery above referred to for restoring the equilibrium of pressure will be set at work automatically, and the pressure within the pipe D will soon be forced up to one hundred and fifty pounds per inch, at which time the proper equilibrium will be obtained. Let us now suppose that a pressure of forty pounds per inch is what is needed in the pipe D on all ordinary occasions. The index should be placed at 40 on the graduated scale, and so fixed as to prevent it from moving readily either to the left or to the right. The weights L L′ L″ should be so adjusted that one pair is but little above the cross-plate F″. If, then, the pressure upon the pipe D should diminish, the piston would settle down, and this pair of weights would rest upon this cross-plate before the index had been moved any considerable distance from the proper point, and the compensating process above referred to would go into operation, and soon restore the equilibrium. If, however, the pressure in the pipe D should increase, the piston H would rise; but, owing to the slot in the upper end of the rod *n*, no motion would be given to the index until it had risen sufficiently, in all ordinary cases, to call the compensating process into requisition sufficiently to prevent any change in the index at all before the remedy had efficiently operated. Suppose, now, that, while the machinery is quietly working with a pressure in the main pipes of forty pounds to the square inch, a fire were to break out in some remote part of the city; some person should run to the nearest hydrant and open it to its greatest capacity as suddenly as possible, and if two of them were opened at the same time the desired effect would be all the more certain.

The sudden escape of so large a quantity of water would greatly diminish the pressure in the main pipes, the piston H would settle down, and the index *o* would be carried to the right as far as previous provision had been made for that purpose. If it be desirable to have a pressure of one hundred and fifty pounds to the inch, a stop which is to limit the throw of this index should be placed at the point marked 150 on the scale. If a less pressure is preferred the stop should be fixed at some corresponding point, and in either case the weights L L′ L″ should be arranged accordingly. When the fire is extinguished the closing of the hydrants will cause a greatly-increased pressure in all the pipes. The piston H will rise rapidly and sufficiently to carry back the index *o* to its normal position, and perhaps much farther, and it will probably require regulation by hand after every such occurrence. The water ought not to be stopped off suddenly in such cases, as it would greatly strain the pipes if the flow were suddenly checked; but to guard against dangers of that nature I have contrived a relief-valve, which will be the subject-matter of subdivision C in this reissue, and to which I shall now only refer.

Instead of the cylinder G and piston H, as shown in Fig. 1, a flexible and elastic diaphragm, H′, with its appurtenances, as shown in Fig. 2, or a rigid diaphragm, H″, working in the sector of a circle, as shown in Fig. 3, may be used. The methods of connecting such contrivances with the other portions of the machinery, as shown in Fig. 1, will readily be seen by reference to the drawing.

It has been seen how the machinery of my water-regulator could be so contrived and adjusted to the varying pressure in the pipes as to be operated by a person at a remote part of the city. I will now show how notice of a great increase of water-supply can be given at headquarters in case the attendant should not be sufficiently on the alert to be made conscious of the change through other means.

*w′ w′*, Fig. 1, is a bell-crank lever, which supports a pivoted bell-clapper. When the piston H descends sufficiently a stud on the rod *m* strikes one arm of the bell-crank lever, and trips the other arm from under the clapper, which drops down, so as to be within reach of the stud *x* on the shaft of the drum N. Every revolution of that shaft will then cause the bell to sound, and thus give the alarm.

Having thus described the invention intended to be patented in this subdivision, I wish it to be understood that I do not intend to limit myself to the precise instrumentalities hereinbefore described, inasmuch as the principle of my invention admits of being exhibited in many different forms. For instance, the mechanism by which the gates are operated may be variously modified, or different mechanism may be substituted therefor; or a cock or conical screw-valve, or a slide or stop valve, may be used instead of the water-gage M and its valve *a* without the exercise of any inventive ingenuity; but I prefer the contrivances above shown for these purposes.

What I claim as new, and desire to secure by Letters Patent, is—

1. A water-gage, M, in arrangement with a water-supply regulator, and so contrived that the pressure in such gage shall be lessened below that in one of the main pipes D in some proportion to the size of the varying orifice into the exit-pipe *e*, as described.

2. In such water-gage, so arranged, I claim, in combination with the valve *a*, the lever *o′*, by which the orifice into such exit-pipe may be regulated, and which will also serve as an index to show the degree of pressure in the main pipe D that is necessary to produce a given degree of pressure in said water-gage, while the said valve *a* remains unchanged in position, substantially as described.

3. Connected with such gage by the pipe *b*, the cylinder G, with its piston H, for the purpose of communicating, through the piston-stem I, to other portions of the machinery, motions corresponding to the degree of pressure upon the under surface of such piston, substantially as described.

4. In combination with cylinder G, piston H, and stem I, the cross-head K, with its weights L L′ L″, so constructed and arranged as to cause the weight, which is raised by the said piston, to gradually increase as that piston rises in height, and to diminish as it descends, substantially as described.

5. The water-gage M, piston H, and bell *t*, with their proper appendages, in combination with a system of water-pipes and hydrants, when the whole is so constructed and arranged as to serve as a water-telegraph to give instant notice at headquarters of the breaking out of a fire in any part of a city, substantially as described.

6. The bell *t*, with its appurtenances, so constructed, substantially as described, that the lowering of the piston H below a point to be fixed beforehand shall cause the ringing of the bell.

7. The water-gage M, piston H, and lever *o′*, with their proper appurtenances, in combination with a system of water-pipes, when the whole are so contrived and arranged that a person at a distance from the actuating machinery of the system may so operate instantaneously upon that machinery as to increase the pressure in the water-pipes sufficiently for the purpose of fire-extinguishment, substantially in the manner above described.

BIRDSILL HOLLY.

In presence of—
C. G. HILDRETH,
F. T. SCOVELL.